F. SHEDD.
Hay Rake and Loader.
No. 211,269. Patented Jan. 7, 1879.
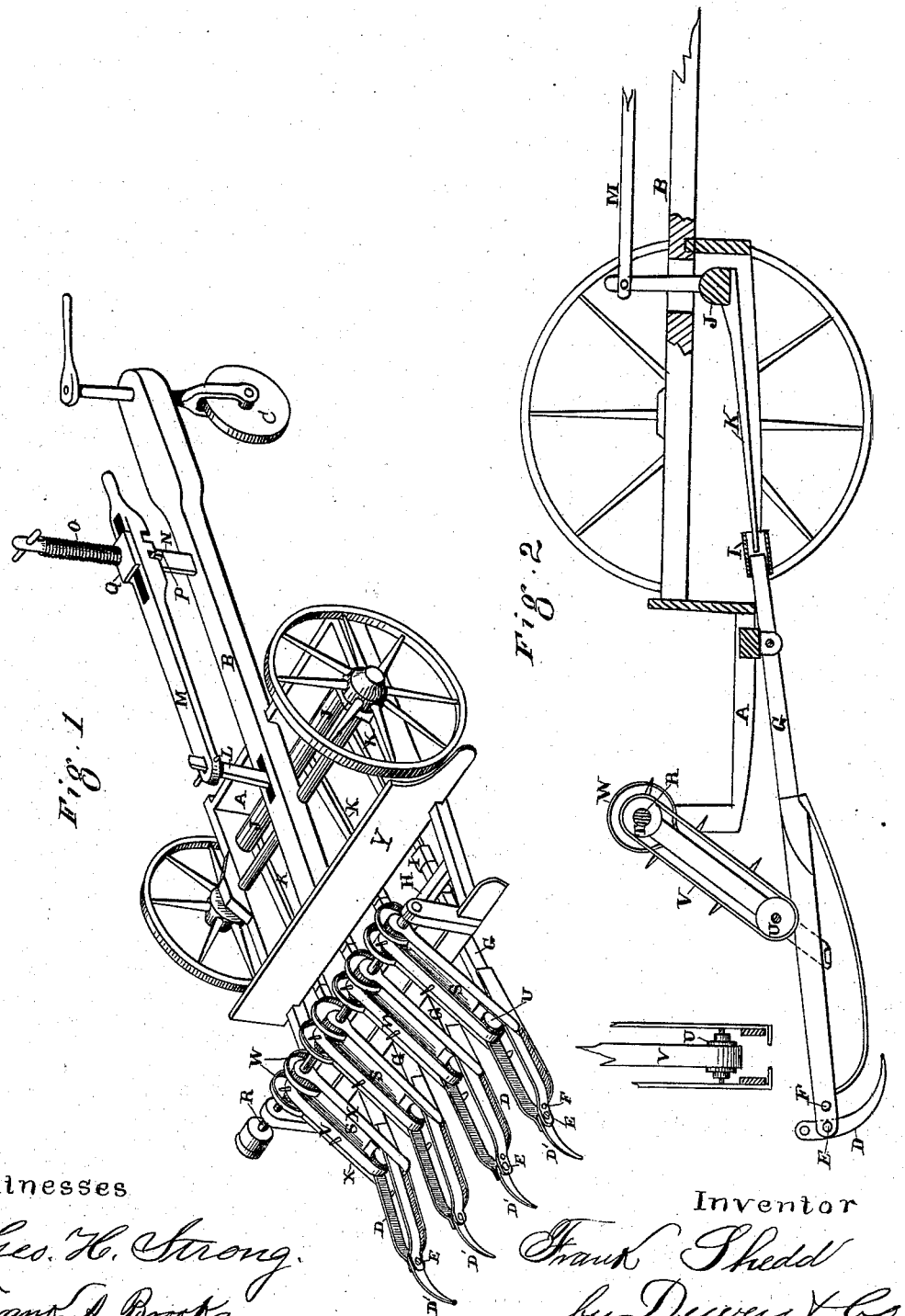
Witnesses
Geo. H. Strong.
Frank A. Brooks
Inventor
Frank Shedd
by Dewey & Co
Attys

UNITED STATES PATENT OFFICE.

FRANK SHEDD, OF SHEDD STATION, OREGON.

IMPROVEMENT IN HAY RAKES AND LOADERS.

Specification forming part of Letters Patent No. 211,269, dated January 7, 1879; application filed May 16, 1878.

*To all whom it may concern:*

Be it known that I, FRANK SHEDD, of Shedd Station, county of Linn, and State of Oregon, have invented a Combined Grain Rake and Elevator; and I do hereby declare the following to be a full, clear, and exact description thereof, reference being had to the accompanying drawings.

My invention relates to a novel method of raking or collecting the grain in a stubble-field, after it is cut by a header and deposited on the ground, and elevating it into a header-wagon.

It consists of a device, operated by horses, having peculiar rakes which accommodate themselves to the inequalities of the ground automatically, the rake-teeth of which are so arranged that, in case a root or other similar obstacle is caught, said teeth turn back on a swivel and are uninjured.

It also consists of a novel mechanism by which all of the rakes, rake-teeth, and elevator-supports are under the control of the driver, so that by a single motion the rakes may all be thrown to or from the ground, as desired.

It further consists in peculiar carriers and elevator-belts with teeth to engage in the grain, and having suitable guides at their upper ends, all connected with the driving mechanism and rakes, so that they accommodate themselves automatically, singly or together, to the angle taken by the rakes, according to the inequalities of the ground, or may be raised or lowered into or out of action by the driver, as desired.

In the drawings, Figure 1 is a perspective view. Fig. 2 is a longitudinal section.

Let A represent the frame to which my device is attached. This frame is mounted on a pair of wheels, and has attached to it the pole B, by which the horses push the rakes over the field, the outer end of the pole B having the usual guiding or steering wheel C.

The rakes D are formed in a peculiar shape, as shown, the upper part being open and the bottom curved upward at its forward end and forming a shoe, which slides on the ground. An open space is left in each rake between these sides and the shoe or bottom, and the sides come together at the front end, as shown, being joined by the pivot or pin E, which fastens the rake-tooth D' in place. This rake-tooth D' is made in a peculiar shape, curving downward, as shown, so that its point is very near the ground. The rake-tooth is pivoted by the pin E to the ends of the meeting sides of the rake, and the rear end of the rake-tooth has a hole made in it to correspond with a similar hole through the sides of the rake. Through this hole is inserted a wooden pin, F, so that in case the rake-tooth should strike a strong root or other obstacle the wooden pin F would break, and the rake-tooth, instead of being broken off, would turn back on its swivel or pin E against the curved forward end of the bottom or shoe of the rake. The peculiar downward-curving shape of the rake-tooth, while effectual in directing the grain onto the belts, as hereinafter described, is also useful in case of striking a root, for, when the wooden pin F breaks, the tooth turns under and back, and then its lower part fits snugly against the forward curved portion of the shoe of the rake.

The wooden bars G, having the rakes D attached to their forward ends, are pivoted, as shown, to the under side of the cross-bar H of the frame. A single rod or bolt passing through holes in the bars G and holes in the hanging ears serves as a pivot, holding the bars G in place, and at the same time admitting of their having a tilting motion, as hereinafter described.

The rear ends of these rake-bars G have a metal socket or sleeve, I, attached to them, the rear end of this socket being open, as shown.

A horizontal shaft, J, extends across the frame beneath and behind the axle, and its ends fit in the frame A in such a manner that it may be given a rotary motion. Attached to this shaft J are the stiff springs or fingers K, the other ends of which fit loosely in the sockets I on the rear end of the rake-bar G.

A lever-bar, L, extends upward from the horizontal shaft J through a groove or slot in the pole B. To the upper end of this lever-bar L is attached, by means of a slot and pin, the hand-bar M, which extends back over the pole B to where the driver stands. Near the rear end of this hand-bar a longitudinal slot is formed in it, through which projects the vertical post N, attached to the pole B.

The hand-bar M has racks formed on its lower edge, which engage with the lugs P, passing transversely through the post N, as shown. A spiral spring, O, is fastened to the upper part of the post N, which, by pressing down on the hand-bar M, keeps the racks engaged with the lugs, thus keeping the hand-bar in any desired position. A small washer-block, Q, rests on the hand-bar, between it and the spring, so that the bar may be moved forward or back with slight friction on the spring.

It will be seen from this construction that by drawing the hand-bar back, so that the forward rack on the bar engages with the lug on the upright post, the hand-bar will draw back the upright lever-bar L on the shaft J, which action will rock the shaft J, and thus elevate the outer ends of the springs or fingers K, as these fingers fit loosely in the sleeves or sockets I in the rear ends of the rake-bars G, and the rake-bars are pivoted or hinged, as described.

The fingers I, by lifting the rear ends of the rake-bars G, depress the forward ends of said rake-bars, and allow the rakes to rest on the ground, ready for work. By pushing the hand-bar M forward, and letting the rear rack engage with the lug N of the upright post, a reverse action is accomplished, and the forward ends of the rakes, with the rake-teeth, are lifted entirely from the ground, and held in an elevated position, as they would be in going to or from a field, or in turning a corner. By having several racks on the hand-bar, the racks and teeth may be set at any desired angle for going up and down a hill. When the rakes rest on the ground, their peculiar construction admits of each rake having an independent vertical motion, to a certain extent, which is sufficient for it to overcome any common obstacle without danger of breakage.

The hand-bar, being engaged by its rack with the lug on the upright posts, holds, by its connections, the shaft J and the springs K in a firm position; but as each spring fits in the socket in the rear end of the rake-bars G, in case the rake should meet a slight elevation, a stone or a clod, it would pass over it by the action of the spring allowing of a vertical motion. Having passed the obstacle, the spring would press on the rear end of the rake-bar and hold the rake back on the ground again. By this means each rake has an independent motion, and accommodates itself to the inequalities of the ground over which the machine is passed.

Transversely across the front part of the frame is placed the shaft R, which is revolved by means of a pulley and a belt passing around the wheel, as shown. On this shaft are keyed several pulleys, corresponding to the number of rake-bars and rakes on the machine. The support S for the elevator-belt consists of the solid interior and extended sides X, as shown. The sides are extended above and have holes formed in them, through which the shaft R passes, and the lower extensions have right-angled projections, which play loosely between the sides and bottom of the rakes, as shown. Pulleys T are mounted on the shaft R, between the upper side extensions of the support S, and pulleys U are placed between the lower extensions of the support, just above the rake, as shown. Around these two pulleys on each support revolves the toothed elevator-belt V, which is operated by the belt passing around the wheel of the machine and the pulley on the end of the shaft R.

Peculiar guides W are attached to the upper end of the elevator-support S, and inclose the shaft R. These guides stand somewhat above the carrier-belt V, but not above the ends of the teeth in it, so that the teeth may carry the grain over the guides onto the draper, which carries the grain up into the wagon.

The peculiar construction of this carrier admits of its accommodating itself to any angle that the rake may take as it moves over an uneven surface. The projections on the lower sides of the carrier grasp the upper sides of the rake and connect the carrier to the rake firmly, but in such a way that the lower end of the carrier may slide back and forth in the rake. The pulley U at the bottom of the carrier has extensions formed at either end, so that as the rake is elevated the sides of the rake bear against the extensions or shoulder of the pulley and lift the lower ends of the carriers without interfering with the motion of either belt, pulley, or rake. As each carrier has the same independent motion which the rakes are allowed, each separate rake and elevator has a motion independent of the other mechanism, and can accommodate itself to inequalities of the surface of the ground without affecting other parts of the machine. The forward ends of the rake-bars G, where they fit into the rakes D, are cut away or grooved, so as to admit of the teeth of the elevator-belt passing down when the carrier is in its lowest position.

By the operation of the hand-bars M, lever-bar L, shaft J, and springs K, throwing the rakes to or from the ground simultaneously, the carriers are also all elevated or depressed at once by the connections herein described.

This grain rake and elevator is designed to take grain up and out of the stubble and elevate it into a header-wagon bed. Instead of taking grain direct from a header into the wagon, I cut the grain with the header with a short elevator, and give it a quarter-turn as it goes out on the stubble, which will leave the grain in a gavel or windrow. When the grain is dry and ready to thrash, the machine described takes it from the stubble and puts it in the wagon, saving the trouble and expense of binding. By this means damp or unripe grain is not taken to the thrasher. The machine can take up in a day all that a header can cut in the same time.

This combined rake and elevator may be run over a field alongside of a wagon and throw the grain from the stubble, by the toothed belts and rakes, onto an elevator and draper, which takes it into the wagon. The elevator to take the grain from this rake to the wagon (and which I have not shown) runs in the space formed between the back of the rakes and the back board $y$, above the cross-bar H. This elevator has been omitted, as its construction is by no means novel, and its insertion would complicate the mechanism.

Having thus described my invention, what I claim as new, and desire to secure by Letters Patent, is—

1. The rakes or fingers D, mounted upon the ends of the pivoted supporting-bars G, so as to have an independent vertical play, in combination with the spring-arms K, connected with the bars, substantially as shown, and for the purpose herein described.

2. The rakes D, mounted upon the supporting-bars G, in combination with the spring-arms K, secured to the rock-shaft J, the lever L, and hand-bar M, for the purpose of adjusting the rakes, substantially as herein described.

3. The rakes D, having the teeth D', supported upon the pins E, and their rear ends held by the wooden pins F, so as to allow the teeth to turn back upon striking an obstruction, substantially as herein described.

4. The rakes D, mounted upon the vertically-adjustable bars G; in combination with the elevators V, pulleys T and U, and their supporting-bars S, said bars having the projecting side pieces, X, with their right-angled projections at the bottom, the whole operating to adjust the elevators to any variations of the rakes, substantially as herein described.

In witness whereof I hereunto set my hand and seal.

FRANK SHEDD. [L. S.]

Witnesses:
A. WHEELER,
T. G. JONSRUD.